United States Patent
Yan (10) Patent No.: US 9,509,835 B2
(45) Date of Patent: Nov. 29, 2016

(54) METHOD AND APPARATUS OF SECURE RECOGNITION FOR PERVASIVE FACE-TO-FACE SOCIAL COMMUNICATIONS

(75) Inventor: Zheng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 27 days.

(21) Appl. No.: 14/395,261

(22) PCT Filed: May 8, 2012

(86) PCT No.: PCT/CN2012/075172
§ 371 (c)(1),
(2), (4) Date: Jan. 9, 2015

(87) PCT Pub. No.: WO2013/166651
PCT Pub. Date: Nov. 14, 2013

(65) Prior Publication Data
US 2015/0312406 A1  Oct. 29, 2015

(51) Int. Cl.
H04M 3/42   (2006.01)
G06Q 50/00  (2012.01)
H04B 1/3827 (2015.01)
H04W 76/02  (2009.01)

(52) U.S. Cl.
CPC .............. *H04M 3/42* (2013.01); *G06Q 50/01* (2013.01); *H04B 1/3833* (2013.01); *H04W 76/02* (2013.01)

(58) Field of Classification Search
None
See application file for complete search history.

(56) References Cited

U.S. PATENT DOCUMENTS

| | | | |
|---|---|---|---|
| 6,711,414 | B1 | 3/2004 | Lightman et al. |
| 7,688,211 | B2* | 3/2010 | Borovoy .................. G08B 1/08 340/505 |
| 9,165,327 | B1* | 10/2015 | Hyndman .............. G06Q 50/01 |
| 2004/0189474 | A1 | 9/2004 | Borovoy et al. |
| 2004/0220807 | A9 | 11/2004 | Tamir et al. |
| 2007/0032240 | A1* | 2/2007 | Finnegan .......... H04M 1/72513 455/445 |
| 2009/0132655 | A1* | 5/2009 | Behrens .............. G06F 21/6218 709/204 |
| 2009/0239467 | A1 | 9/2009 | Gulin et al. |
| 2010/0180009 | A1 | 7/2010 | Callahan |

(Continued)

FOREIGN PATENT DOCUMENTS

| | | |
|---|---|---|
| CN | 1734978 | 2/2006 |
| CN | 101695007 | 2/2010 |

(Continued)

OTHER PUBLICATIONS

International Search Report received for corresponding Patent Cooperation Treaty Application No. PCT/CN2012/075172, dated Feb. 28, 2013 3 pages.

(Continued)

*Primary Examiner* — Erika Washington
(74) *Attorney, Agent, or Firm* — Mintz Levin Cohn Ferris Glovsky and Popeo, P.C.

(57) ABSTRACT

A method of secure recognition for pervasive face-to-face social communications may comprise: initiating a procedure for generating a recognition protocol; exchanging information for the recognition protocol with one or more apparatuses, wherein the information indicates wearable devices used in executing the recognition protocol and users carrying the wearable devices; and generating the recognition protocol by negotiating with the one or more apparatuses a kind of code word which is presented by the wearable devices during executing the recognition protocol.

16 Claims, 5 Drawing Sheets

(56) References Cited

U.S. PATENT DOCUMENTS

| | | | |
|---|---|---|---|
| 2010/0279611 A1 | 11/2010 | Kumazawa | |
| 2011/0193779 A1 | 8/2011 | Williams | |
| 2012/0079019 A1 | 3/2012 | Miettinen et al. | |
| 2012/0084364 A1 | 4/2012 | Sivavakeesar | |
| 2013/0086380 A1* | 4/2013 | Krishnaswamy | H04L 63/08 713/168 |
| 2013/0198281 A1* | 8/2013 | Scuba | H04L 67/18 709/204 |
| 2014/0132390 A1* | 5/2014 | Loveland | H05B 37/0227 340/5.8 |

FOREIGN PATENT DOCUMENTS

| | | |
|---|---|---|
| EP | 2146490 A1 | 1/2010 |
| WO | 2013/131244 A1 | 9/2013 |
| WO | 2013/143144 A1 | 10/2013 |

OTHER PUBLICATIONS

European Search Report for European Application No. EP12876517, issued Nov. 13, 2015 (2 pages).

Ahtiainen et al., "Awareness Networking in Wireless Environments", IEEE Vehicular Technology Magazine, vol. 4, Issue 3, Sep. 2009, pp. 48-54.

Yan et al., "AdChatRep: A Reputation System for MANET Chatting", SCI, Sep. 18, 2011, pp. 43-48.

Sawhney et al., "Nomadic Radio: Scaleable and Contextual Notification for Wearable Audio Messaging", In proceedings of CHI, ACM Press, May 15-20, 1999, pp. 96-103.

"Orth et al., "Fabric Computing Interfaces", Conference summary on Human factors in computing systems, Apr. 1998, pp. 1-3".

Small et al., "The Printing Dress: You are what you Tweet", Microsoft Research, ICWC, 2011, 8 pages.

"Lovejackets", Studio 5050, Retrieved on Dec. 12, 2014, Webpage available at : http://www.5050ltd.com/loveRedux.php.

"Courtly Bags", Studio 5050, Retrieved on Dec. 12, 2014, Webpage available at http://www.5050ltd.com/courtlyBags.php.

"2012 EDAG Light Car—Sharing concept car", 2012 Geneva Motor Show, Retrieved on Dec. 12, 2014, Webpage available at : automobllesrevlew.com/auto-newa/geneva-motor-show-eclag-llght-car-sharlng-concept-car/434101.

Kambourakis et al., "Device Authentication in Wireless and Pervasive Environments", Intelligent Automation and Soft Computing, vol. 16, No. 3, 2010, pp. 399-418.

Kortuem et al., "When Peer-to-Peer comes Face-to-Face: Collaborative Peer-to-Peer Computing in Mobile Ad hoc Networks", First International Conference on Peer-to-Peer Computing, Aug. 2001, 15 pages.

* cited by examiner

METHOD AND APPARATUS OF SECURE RECOGNIZATION FOR PERVASIVE FACE-TO-FACE SOCIAL COMMUNICATIONS

RELATED APPLICATION

This application was originally filed as PCT Application No. PCT/CN2012/075172 filed May 8, 2012.

FIELD OF THE INVENTION

The present invention generally relates to social communications. More specifically, the invention relates to stranger recognition for pervasive face-to-face social communications.

BACKGROUND

The modern communications era has brought about a tremendous expansion of communication networks. Communication service providers and device manufacturers are continually challenged to deliver value and convenience to consumers by, for example, providing compelling network services, applications, and contents. The development of communication technologies has contributed to an insatiable desire for new functionality. Portable communication apparatuses (for example, mobile phones) are no longer just tasked with making telephone calls. Users could chat with strangers nearby using mobile devices first and then decide to meet with each other for a direct face-to-face contact, for example, for the purpose of purchasing 'buy 3 pay 2' or series goods together. This kind of thorough pervasive social communications is an essential and valuable compensation for not only Internet social networking, but also traditional social communications. In such a situation, it is important to make a recognition mechanism for strangers to meet with each other in a secure and easy way.

SUMMARY

The present description introduces a novel solution to realize secure recognition for pervasive face-to-face social communications based at least in part on a mobile network, local connectivity and fashionable technology, which is an inter-disciplinary technology and opens up a new research horizon on security.

According to a first aspect of the present invention, there is provided a method comprising: initiating a procedure for generating a recognition protocol; exchanging information for the recognition protocol with one or more apparatuses, wherein the information indicates wearable devices used in executing the recognition protocol and users carrying the wearable devices; and generating the recognition protocol by negotiating with the one or more apparatuses a kind of code word which is presented by the wearable devices during executing the recognition protocol.

According to a second aspect of the present invention, there is provided an apparatus comprising: at least one processor; and at least one memory comprising computer program code, the at least one memory and the computer program code configured to, with the at least one processor, cause the apparatus to perform at least the following: initiating a procedure for generating a recognition protocol; exchanging information for the recognition protocol with one or more other apparatuses, wherein the information indicates wearable devices used in executing the recognization protocol and users carrying the wearable devices; and generating the recognition protocol by negotiating with the one or more other apparatuses a kind of code word which is presented by the wearable devices during executing the recognition protocol.

According to a third aspect of the present invention, there is provided a computer program product comprising a computer-readable medium bearing computer program code embodied therein for use with a computer, the computer program code comprising: code for initiating a procedure for generating a recognition protocol; code for exchanging information for the recognition protocol with one or more apparatuses, wherein the information indicates wearable devices used in executing the recognition protocol and users carrying the wearable devices; and code for generating the recognition protocol by negotiating with the one or more apparatuses a kind of code word which is presented by the wearable devices during executing the recognition protocol.

According to a fourth aspect of the present invention, there is provided an apparatus comprising: initiating means for initiating a procedure for generating a recognition protocol; exchanging means for exchanging information for the recognition protocol with one or more other apparatuses, wherein the information indicates wearable devices used in executing the recognition protocol and users carrying the wearable devices; and generating means for generating the recognition protocol by negotiating with the one or more other apparatuses a kind of code word which is presented by the wearable devices during executing the recognition protocol.

In an exemplary embodiment, the procedure for generating the recognition protocol may be initiated at a first apparatus by the following: sending a request for a meeting to a second apparatus, wherein the one or more apparatuses comprise the second apparatus; and receiving an acknowledgment from the second apparatus. According to the exemplary embodiment, said exchanging the information for the recognition protocol may comprise: providing a first pair of parameters to the second apparatus, wherein the first pair of parameters comprises an identifier of a wearable device carried by a user of the first apparatus and an anonymous identifier of the user of the first apparatus; and getting from the second apparatus a response with a second pair of parameters, wherein the second pair of parameters comprises an identifier of a wearable device carried by a user of the second apparatus and an anonymous identifier of the user of the second apparatus. In accordance with an exemplary embodiment, the kind of code word may comprise one or more argots, and said negotiating with the one or more apparatuses may comprise: sending an original argot and its order designed at the first apparatus to the second apparatus; receiving a response with a confirmed argot from the second apparatus, wherein the confirmed argot comprises the original argot, a revised argot or a reply argot; sending an original presentation style of the confirmed argot designed at the first apparatus to the second apparatus; and receiving a response with a confirmed presentation style from the second apparatus, wherein the confirmed presentation style comprises the original presentation style or a revised presentation style.

In another exemplary embodiment, the procedure for generating the recognition protocol may be initiated at a first apparatus by the following: multicasting a request for a meeting to a group of apparatuses; receiving respective acknowledgments from multiple second apparatuses among the group of apparatuses, wherein the one or more apparatuses comprise the multiple second apparatuses; and multicasting respective anonymous identifiers of users of the first apparatus and the multiple second apparatuses to the multiple second apparatuses. According to the exemplary embodiment, said exchanging the information for the recognization protocol may comprise: multicasting a first pair of parameters to the multiple second apparatuses, wherein the first pair of parameters comprises an identifier of a wearable device carried by the user of the first apparatus and an anonymous identifier of the user of the first apparatus; and obtaining respective second pairs of parameters from the multiple second apparatuses through multicast, wherein the second pair of parameters comprises an identifier of a wearable device carried by the user of the second apparatus and an anonymous identifier of the user of the second apparatus. In accordance with an exemplary embodiment, the kind of code word may comprise one or more argots, and said negotiating with the one or more apparatuses may comprise: multicasting an argot and its order designed at the first apparatus to the multiple second apparatuses along with a first security parameter; receiving respective confirmations of the argot from the multiple second apparatuses along with the first security parameter; multicasting a presentation style of the argot designed at the first apparatus to the multiple second apparatuses along with a second security parameter; and receiving respective confirmations of the presentation style from the multiple second apparatuses along with the first security parameter and the second security parameter.

In still another exemplary embodiment, the one or more apparatuses may comprise a first apparatus, and the procedure for generating the recognition protocol may initiated at a second apparatus by the following: receiving a request for a meeting from the first apparatus; and sending an acknowledgment to the first apparatus. According to the exemplary embodiment, said exchanging the information for the recognization protocol may comprise: obtaining a first pair of parameters from the first apparatus, wherein the first pair of parameters comprises an identifier of a wearable device carried by a user of the first apparatus and an anonymous identifier of the user of the first apparatus; and sending a response with a second pair of parameters to the first apparatus, wherein the second pair of parameters comprises an identifier of a wearable device carried by a user of the second apparatus and an anonymous identifier of the user of the second apparatus. In accordance with an exemplary embodiment, the kind of code word may comprise one or more argots, and said negotiating with the one or more apparatuses may comprise: receiving an original argot and its order from the first apparatus; sending a response with a confirmed argot to the first apparatus, wherein the confirmed argot comprises the original argot, a revised argot or a reply argot; receiving an original presentation style of the confirmed argot from the first apparatus; and sending a response with a confirmed presentation style to the first apparatus, wherein the confirmed presentation style comprises the original presentation style or a revised presentation style.

In a further exemplary embodiment, the procedure for generating the recognition protocol may be initiated at a second apparatus by the following: receiving a request for a meeting from a first apparatus through multicast, wherein the one or more apparatuses comprise the first apparatus and at least one third apparatus; sending an acknowledgment to the first apparatus; and obtaining respective anonymous identifiers of users of the first apparatus and the at least one third apparatus through multicast. According to the exemplary embodiment, said exchanging the information for the recognization protocol may comprise: obtaining a first pair of parameters from the first apparatus through multicast, wherein the first pair of parameters comprises an identifier of a wearable device carried by the user of the first apparatus and an anonymous identifier of the user of the first apparatus; providing a second pair of parameters as a response through multicast, wherein the second pair of parameters comprises an identifier of a wearable device carried by the user of the second apparatus and an anonymous identifier of the user of the second apparatus; and obtaining a third pair of parameters from a respective of the at least one third apparatus through multicast, wherein the third pair of parameters comprises an identifier of a wearable device carried by the user of the third apparatus and an anonymous identifier of the user of the third apparatus. In accordance with an exemplary embodiment, the kind of code word may comprise one or more argots, and said negotiating with the one or more apparatuses may comprise: obtaining an argot and its order from the first apparatus along with a first security parameter through multicast; confirming the argot by sending back the first security parameter to the first apparatus; obtaining a presentation style of the argot from the first apparatus along with a second security parameter through multicast; and confirming the presentation style by sending back the first security parameter and the second security parameter to the first apparatus.

According to various exemplary embodiments, the presentation style may comprise but not limited to at least one of: flashing, blinking, color, tone or music attached to an argot, and displaying order. The identifier of the wearable device may comprise but not limited to at least one of an identity, a name and a type of the wearable device. In an exemplary embodiment, said generating the recognition protocol may comprise: demonstrating the recognition protocol designed with the kind of code word; and confirming the designed recognition protocol. According to exemplary embodiments, the recognition protocol may be executed in response to a detection of at least one of the one or more apparatuses within a predetermined range, and wherein the kind of code word may be presented based at least in part on the recognition protocol during the execution of the recognition protocol.

In exemplary embodiments of the present invention, the provided method, apparatus, and computer program product can enable people unknown with each other who communicated before via pervasive social networking or other networks to recognize with each other and meet in a secure and easy way. The proposed solution can provide an efficient, secure and convenient measure to recognize people in pervasive social communications, especially in a fashionable approach that can be easily accepted by users. For example, the proposed solution can support instant social face-to-face meeting in a safe, easy and playful way, especially when users do not have internet connection, but with location proximity.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is comprised in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Fashion industries are now making efforts to combine fashion and high technologies. Aesthetics is becoming a key factor that influences a user to make a purchase decision. Fashion has become a social element to impress and attract people. Fashionable technology refers to the intersection of design, fashion, science and technology. It integrates aesthetics and fashionable into functional technologies. As one part of fashionable technology, fashionable wearable represents the fashionable technology by using garments, accessories or jewelries. Mobile phone, as one major device for pervasive social communications, can be further developed to extend its functions into wearable devices for better notification or attraction, in order to achieve sound social effect and security.

For example, wearable computing designs equipments and devices wearable by humans. The most common wearable items may comprise clothes, shoes, bracelets, handbags, hats, gloves, and so on. Fashionable technologies go beyond wearable computing by emphasizing aesthetics. For example, a neckset developed with fashionable technologies aims to mine ambient contextual information and send it to users as notification. It gathers the ambient sound through microphones on the neckset and notifies users via audio messaging or tactile feedback on the body. Jacket has become a popular platform for developing fashionable technology due to its daily-use nature. Music Jacket aims to extend musical environment. It may combine a normal Levi jean jacket with a fabric keyboard and a midi signal generator to produce a sound and apply speakers to amplify the sound. All the add-ons are embroidered inside the jacket. Smart Jacket is designed to control body temperature, enhance night visibility and monitor activity level. For example, some parts of the jacket glow in the evening to warn safety. Love Jackets are a pair of jackets designed for social awareness. Once the pair finds each other, for example in at least 3-meter distance, facing each other, the two jackets may beep and blink. Women consider dresses as one symbol of femininity. There has a deep connection between dresses and fashion. Firefly Dress and necklace use conductive fabric to distribute power throughout the dress. The dress was attached with small lights, such as LEDs. When the wearer moves, the LEDs brush lightly against the fabrics power, creating a dynamic lightening effect. A more recent artifact is the Microsoft Printing Dress. The printing dress enables wearer to enter their thoughts onto the fabric and wear them as a form of art displayed to the public. Bags are among the top consumed fashionable accessories. It is thus natural to design technology-enhanced fashionable bags. Courtly bag is a fashionable bag containing lights and sounds that can shine in dark and transmit information. LadyBag is designed as a notification of missing items in the bag. All items in the bags, such as keys, phones may be attached with Radio-Frequency Identification (RFID) tag. Therefore, the bag keeps log of items in the bag. It shows the icons of items that are missing on the LED display of the bag.

However, all of these works shed light on novel means and materials for fashionable technology, but have not investigated the social value and usage of the fashionable technology, especially for social communications. Most of previous designs are standalone accessories, which cannot communication with each other for security purpose. Most of them could be very expensive and still in its infant stage.

On the other hand, a communication network such as Mobile Ad Hoc Network (MANET), Bluetooth network, Wireless Local Area Network (WLAN) and the like has a good prospect of becoming a practical platform for instant social activities. For example, MANET is a collection of autonomous nodes that communicate with each other by forming a multi-hop radio network and maintaining connectivity in a decentralized manner. A social group could be instantly formed based at least in part on MANET not only by people socially connected, but also those physically in proximity, such as groups for common instant social activities. For example, Groupon (http://www.groupon.com) provides daily digests of group purchase activities to users; eRideShare (http://www.erideshare.com/) helps people with similar driving routes to share car riding. Users could chat with strangers nearby using mobile devices via MANET first and then decide to meet with each other for a direct face-to-face contact, for an instance, for the purpose of purchasing 'buy 3 pay 2' or series goods together. This kind of thorough pervasive social communications is an essential and valuable compensation for not only Internet social networking, but also traditional social communications.

Trust plays an important role in the pervasive social networking for reciprocal activities among nearby strangers. It helps people overcome perceptions of uncertainty and risk and engages in "trust-related behaviors". During the instant social activities, users are not necessarily acquaintances but more likely to be strangers. They generally talk with each other using nicknames and build up initial trust based at least in part on MANET, Bluetooth, WLAN or even cellular communications. This initial trust could motivate them to make an instant appointment for a face-to-face meeting. In such a situation, it is important to make a recognition mechanism for strangers to meet with each other in a secure and easy way.

Some research works have focused on social activities via mobile ad-hoc networks, for example, Junction (which is a mobile ad hoc and multiparty platform for MANET applications), Micro-blog (which helps users to post micro-blogs tagged by locations and viewed by others), AdSocial (which aims to provide a pervasive social communication platform) and so on. However, secure recognition for face-to-face meeting between strangers after pervasive social networking is not considered at all in these projects. Traditional centralized social networking systems (such as facebook) have not taken this issue into account at all. They cannot support instant social face-to-face meeting in a safe, easy and fashionable way, especially when users do not have internet connection, but with location proximity.

In practice, MANET may provide a generic platform for pervasive social networking. Various instant social activities can be supported by this platform. For some social activities, after anonymous MANET based communications, people in proximity, but unfamiliar with each other would like to meet for further face-to-fact contact. How to make unknown people to meet without mismatch and avoid troubles after MANET based communications? How to sustain their initially established trust through right recognition in crowds? How to preserve their privacy (for example, still using nicknames and hiding real names) but assure correct recognition in a fashionable way? How to fight against malicious or bad guys who may personate somebody for face-to-face contact? In this situation, it is essential to provide an approach to let people who communicated before via pervasive social networking or other networks recognize with each other and meet in a secure, easy and playful way.

According to various exemplary embodiments, an easy and secure recognition approach by integrating pervasive social communications via a communication network (such as MANET, Bluetooth, WLAN and the like) with fashionable technology is proposed. A Wearable Device (WD), as an illustration platform, may be used to coordinate with a wearer's mobile device in order to provide a new way of fashionable communications for pervasive social networking that is easily acceptable in terms of aesthetics, prices and functions. Concretely, a WD (for example, embed into handbags, garments, accessories or jewelries) may be applied with the assistance of its user's mobile device (for example, a mobile phone or a portable apparatus) to provide a secure and fashionable way to recognize strangers for face-to-face social communications. The WD may be decorated with some displaying elements, such as LED lights. The status of the LED lights may be controlled by a corresponding mobile WD application (MWA) executed in the WD wearer's mobile device. The communication between the WD and the MWA is securely paired, thus the information displayed or illustrated by the WD can be controlled by the MWA. For example, the control signal between the WD and MWA may be transmitted through Bluetooth or other local connection methods.

In exemplary embodiments, for secure and fashionable recognition, the WD may be used to illustrate a pre-defined recognition protocol among strangers. The WD may play as a representing or displaying platform, in order to make short distance pervasive social communications obvious and attractive. The recognition protocol may comprise a kind of code word (such as one or several rounds of 'argot') interaction in order to securely make the strangers recognize with each other in crowds. A successful execution of the recognition protocol may be coordinated by mobile devices via a communication network like MANET, Bluetooth or WLAN. For example, the display of WDs can be coordinated based at least in part on the control and communications of their corresponding MWAs.

Figure 1:
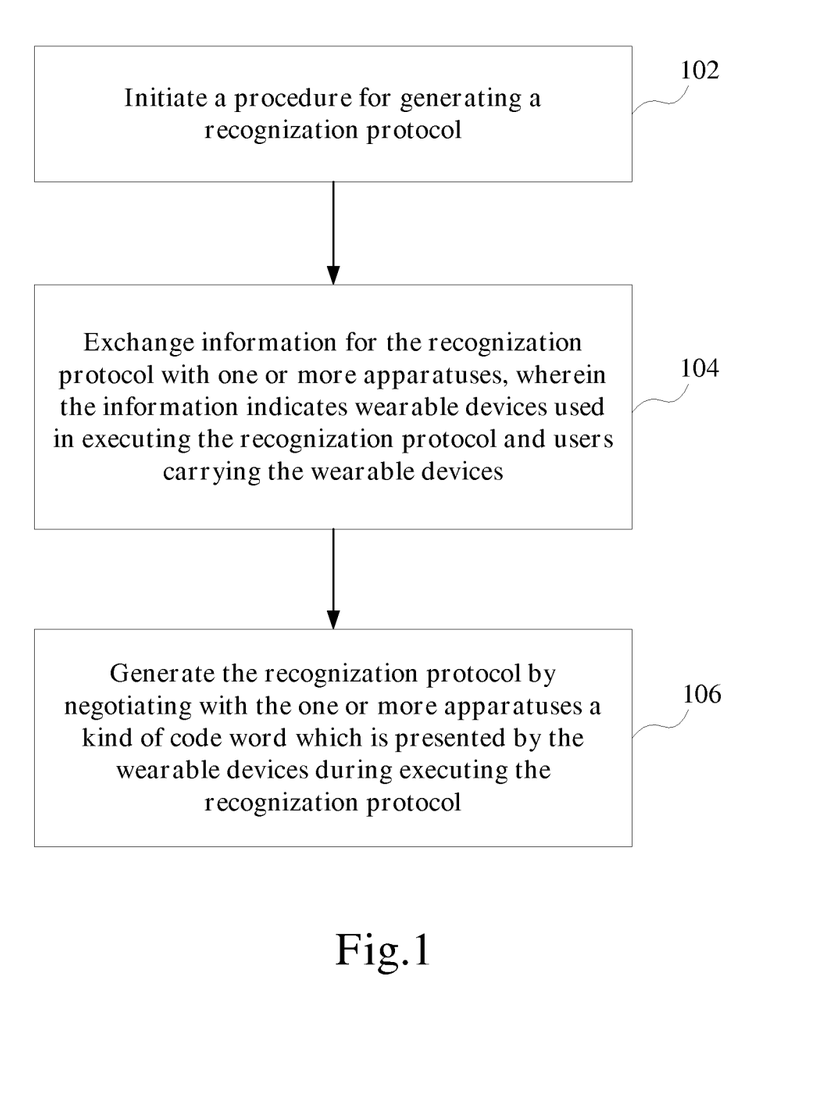
FIG. 1 is a flowchart illustrating a method of secure recognization for pervasive face-to-face social communications in accordance with embodiments of the present invention.

FIG. 1 is a flowchart illustrating a method of secure recognition for pervasive face-to-face social communications in accordance with embodiments of the present invention. The exemplary method may be applied into such kind of scenario that strangers who for example in vicinity communicate with each other in a digital way via mobile ad hoc networks would like to make an instant face-to-face meeting after establishing initial trust. It is contemplated that the proposed method also may be applied to any other suitable scenarios where a social face-to-face meeting in a safe, easy and fashionable way may be needed by strangers. The solution according to the exemplary embodiments provides a secure and fashionable approach to help them recognize with each other with attraction or fascination.

In the illustrated embodiment, an apparatus at which the method illustrated in FIG. 1 may be implemented can be any type of user equipment comprising portable terminals, wireless devices, smart phones, laptop computers, handsets, mobile stations/units/devices, multimedia tablets, Internet nodes, communicators, Personal Digital Assistants (PDAs), or any combination thereof. A recognition protocol may be designed by users through their apparatuses like mobile devices during the pervasive social networking via a network such as MANET, Bluetooth, WLAN and the like. For example, those people unknown with each other can use their mobile devices to define how to recognize with each other if a face-to-face meeting is needed. It is noted that photo sharing or video sharing may not be preferred by some users who would like to keep their privacy by hiding any tracking clues and personal information. As shown in block 102 of FIG. 1, a procedure for generating a recognition protocol may be initiated at an apparatus of a user. For example, this user may be an inviter of a meeting or an invitee of a meeting. In block 104, the user may use his/her apparatus to exchange information for the recognition protocol with one or more apparatuses, for example the mobile device(s) of participant(s) of this meeting. According to exemplary embodiments, the exchanged information may indicate WDs used in executing the recognition protocol and users carrying the WDs. By negotiating with the one or more apparatuses a kind of code word which may be presented by the WDs during executing the recognition protocol, the recognition protocol may be generated as shown in block 106. In an exemplary embodiment, the generated recognition protocol may be executed in response to a detection of at least one of the one or more apparatuses within a predetermined range (for example, in watching distance or within a communication range allowed by a network supporting communications between two or more user terminals). When the recognition starts or during the execution of the recognition protocol, the kind of code word such as one or more argots may be presented based at least in part on the recognition protocol, for example by flashing, blinking, variable color, tones/music attached to the argot, displaying order and/or the like.

There may be many designs for WD. Generally, aesthetics, prices and functions may be taken into account. A WD to be designed can be a surface material or decoration of a handbag, a hat, clothes or many other kinds of wearable. In exemplary embodiments, the WD may be wearable and the MWA may be in a mobile device (for example, a wearer's mobile phone). There may be two ways of information display: the information displayed on the WD to the public and the information displayed in a mobile device screen that is provided by the MWA. The MWA and the WD may be paired in a secure way, for example, by a secret key. Thus, the MWA can uniquely control the display of paired WD. The WDs can communicate with each other and coordinate their display through the communications of MWAs, for example via MANET, Bluetooth, WLAN or the like.

Figure 2:
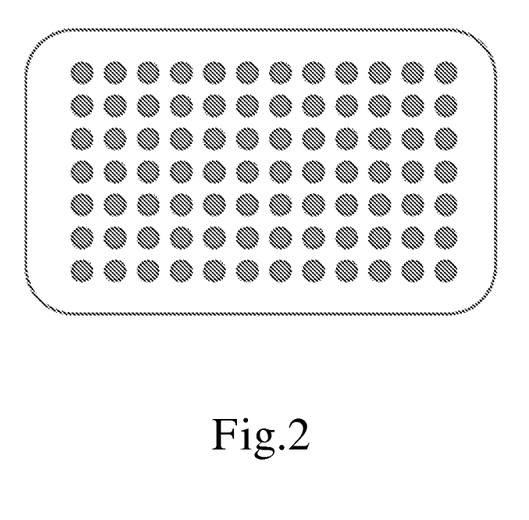
FIG. 2 shows an exemplary wearable device embroidered with a Light-Emitting Diode (LED) panel with an array of LED lights in accordance with embodiments of the present invention.

FIG. 2 shows an exemplary WD embroidered with an LED panel with an array of LED lights in accordance with embodiments of the present invention. The colors of the LEDs can be customized upon need. Each light may have two states: on or off. When all lights are off, the LED panel serves as a normal decoration. When the light is turned on, it can show one or more colors. When a certain signal is sent to the LED panel, the array can display meaningful information on the wearable that is decorated, serving as a blinking, shining and unique component of the wearable. One example implementation is using arrays of LED in order to control the price. This is one of the cheapest ways to display information. It will be appreciated that other techniques also can be adopted for wearable display purpose.

Figure 3:
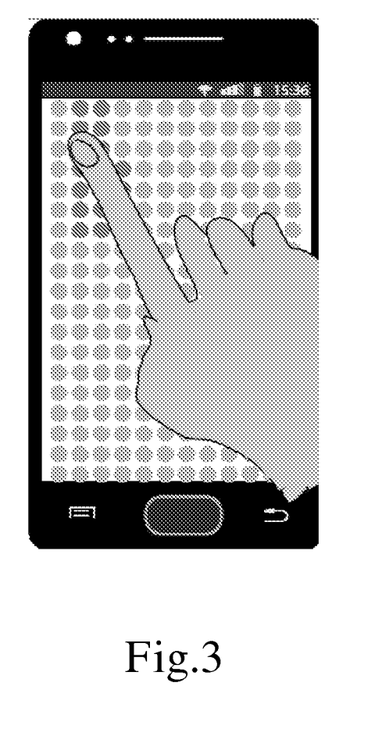
FIG. 3 shows an exemplary touch screen User Interface (UI) to define an argot in accordance with embodiments of the present invention.

In an exemplary embodiment, MWA may be a private mobile application in personal mobile device that can be used to design what is shown and how to show it on a WD. It also may serve as a remote controller of the WD. It may be one function of pervasive social networking application used to design a recognition protocol. FIG. 3 shows an exemplary touch screen UI to define an argot in accordance with embodiments of the present invention. For example, the MWA may provide the UI to define at least one of the following: an identifier such as identity, type and name of wearable (for example, handbag, hat, T-shirt or jacket) used for recognition, the number of recognition steps, an argot for each step of the recognition and the respective order. For designing the argot, the MWA may provide a way to let its user to design how to represent or display the argot on the WD such as LED panel. For example, the MWA may emulate the LED panel of WD. The user can plan the argot by drawing on the surface of a display screen (such as a touch screen) of an apparatus to which the MWA is applied. The user can also design representing or displaying style by customizing the display wizard. Once the user confirms his/her design, the MWA can save the argot into the protocol.

According to an exemplary embodiment, WD and MWA can communicate via Bluetooth. For example, the WD may have a secret key. The MWA needs the key in order to pair up with the WD. This design can ensure the security of the proposed solution. Therefore, only an authorized MWA can control the display of the WD. Once successfully paired up, the MWA can send a signal to control the display of the WD, for example, a status of each LED light and its color and display style if it is on, as well as the music/tone attached to each piece of information (such as an argot). Thus, the WD display can be designed by the wearer through a UI associated with the MWA, for example via a touch screen, as shown in FIG. 3.

According to another exemplary embodiment, two or more WDs can also coordinate with each other based at least in part on communications among mobile devices supporting MWAs. Thus, the WD display may be coordinated through the communications between mobile devices supporting MWAs. For example, a kind of code word such as a series of argots can be displayed one by one (for example in an order) on the WDs of different wearers aiming to recognize for a face-to-face meeting. Alternatively, different parts of one argot can be displayed in different wearers' WDs for secure recognition. The argot could be a word, a picture, a symbol, and so on. A series of argots can be applied in the recognition protocol in order to achieve good security.

Therefore, a user wearing WD (as shown in FIG. 2) and carrying a paired apparatus supporting MWA (which may provide an easy UI to instantly design a recognition protocol, as shown in FIG. 3) can enable a recognition protocol to be generated through negotiation with potential users (such as other WD wearers) via secure communications, for example MANET, Bluetooth, WLAN, short-range wireless communication or any other suitable communications provided with a secure mechanism, by performing exemplary method as illustrated in FIG. 1. According to exemplary embodiments, the recognition protocol can be designed by indicating an identifier (such as an identity, a name and/or a type) of WD for mobile device local pairing and one or more 'argots' used in each step of the protocol, as well as their displaying style via the MWA. The MWA can provide a UI to help a user easily fulfill this function, as described with respect to FIG. 3. For example, a procedure of recognition protocol generation may be initiated by requesting protocol generation or acknowledging a request of protocol generation. A party joining in a meeting may select a WD (such as a fashionable wearable device) for pairing with his/her apparatus and notify one or more other parties. Then, a negotiation of a kind of code word (such as one or more argots) used in the recognition protocol may be made for example by indicating the specific content and the respective step/order of the code word. Alternatively or additionally, during the above negotiation process, a display style of this kind of code word (such as flashing, blinking, color, tones/music attached to the argot, displaying order, and/or the like) can be decided by communications among respective parties joining in the meeting. The above negotiation process may be repeated until a design with respect to the code word is finished. A user may demonstrate the designed recognition protocol, for example at the user apparatus, for final confirmation. If the user does not satisfy the design, the above negotiation process may be repeated. The generated protocol can support recognition for two users or multiple users, as detailed below with respective to FIG. 4 and FIG. 5, respectively.

Figure 4:
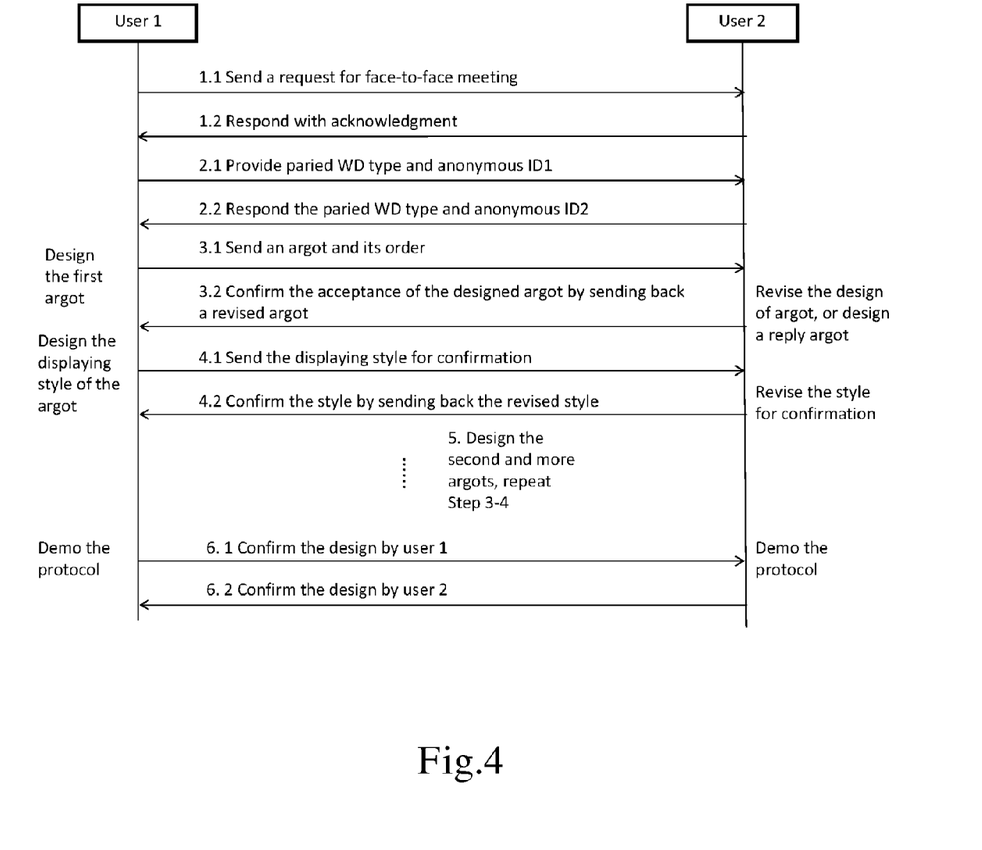
FIG. 4 illustrates an exemplary recognition protocol generation procedure between two users in accordance with an embodiment of the present invention.

FIG. 4 illustrates an exemplary recognition protocol generation procedure between two users in accordance with an embodiment of the present invention. In an exemplary embodiment, a user (such as User 1 shown in FIG. 4) would like to make an instant face-to-face meeting with another user (such as User 2 shown in FIG. 4). In this case, User 1, as an inviter of the meeting, may use his/her apparatus (which is also called as a first apparatus) to perform a method of secure recognition for pervasive face-to-face social communications, as described with respect to FIG. 1. It is noted that in this example the one or more apparatuses as mentioned in block 104 of FIG. 1 merely comprise an apparatus of User 2, which is also called as a second apparatus. Specifically, User 1 may initiate the procedure for generating the recognition protocol at the first apparatus by sending a request for the meeting to the second apparatus and receiving an acknowledgment from the second apparatus of User 2. Then User 1 may use the first apparatus to perform a process of exchanging the information for the recognition protocol with the second apparatus of User 2 (as shown in block 104 of FIG. 1). According to an exemplary embodiment, this exchanging process may comprise: providing to the second apparatus a first pair of parameters which may comprise an identifier of a WD carried by User 1 and an anonymous identifier (such as nickname) of User 1; and getting from the second apparatus a response with a second pair of parameters which may comprise an identifier of a WD carried by User 2 and an anonymous identifier (such as nickname) of User 2, as illustrated in FIG. 4. From the perspective of User 1, a negotiation of an argot with User 2 may be made, for example, by sending an original argot and its order designed at the first apparatus to the second apparatus; receiving a response with a confirmed argot from the second apparatus, which may comprise the original argot, a revised argot or a reply argot; sending an original presentation style of the confirmed argot designed at the first apparatus to the second apparatus; and receiving a response with a confirmed presentation style from the second apparatus, which may comprise the original presentation style or a revised presentation style. Thus it can be seen that User 2 may accept the argot as originally designed by User 1, or revise the received argot from User 1, or even design a new argot as a reply argot of the received argot from User 1. As shown in FIG. 4, a second or more argots may be designed by negotiations between User 1 and User 2.

Correspondingly, User 2 may initiate the procedure for generating the recognition protocol at the second apparatus by receiving a request for the meeting from the first apparatus and sending an acknowledgment to the first apparatus of User 1. Then User 2 may use the second apparatus to perform a process of exchanging the information for the recognition protocol with the first apparatus of User 1 (as shown in block 104 of FIG. 1). According to an exemplary embodiment, this exchanging process may comprise: obtaining from the first apparatus a first pair of parameters which may comprise an identifier of a WD carried by User 1 and an anonymous identifier (such as nickname) of User 1; and sending to the first apparatus a response with a second pair of parameters which may comprise an identifier of a WD carried by User 2 and an anonymous identifier (such as nickname) of User 2, as illustrated in FIG. 4. From the perspective of User 2, a negotiation of an argot with User 1 may be made, for example, by receiving an original argot and its order from the first apparatus; sending a response with a confirmed argot to the first apparatus, which may comprise the original argot, a revised argot or a reply argot; receiving an original presentation style of the confirmed argot from the first apparatus; and sending a response with a confirmed presentation style to the first apparatus, which may comprise the original presentation style or a revised presentation style. According to exemplary embodiments, User 1 and User 2 can enable the recognition protocol generated by respectively demonstrating the recognition protocol designed with the one or more argots and confirming the designed recognition protocol.

Figure 5:
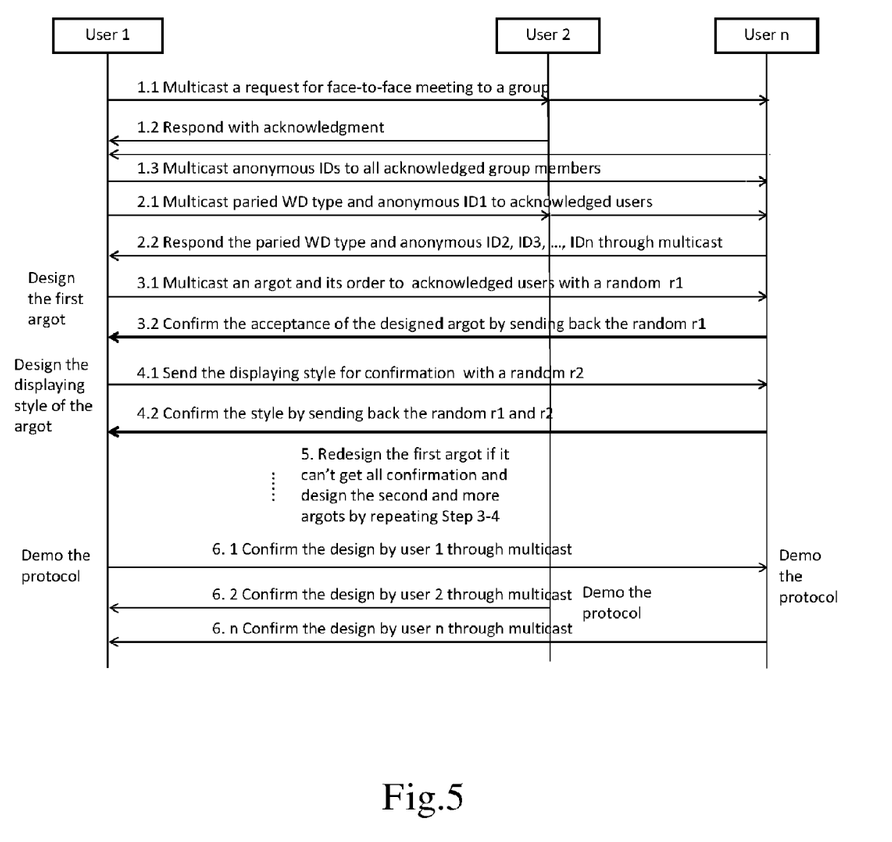
FIG. 5 illustrates an exemplary recognition protocol generation procedure among multiple users in accordance with an embodiment of the present invention.

FIG. 5 illustrates an exemplary recognition protocol generation procedure among multiple users in accordance with an embodiment of the present invention. In the example illustrated in FIG. 5, User 1 would like to make an instant face-to-face meeting with multiple users (such as User 2, . . . , and User n shown in FIG. 5, where n is a positive integer which is equal to or larger than 3). Similar to the example illustrated in FIG. 4, User 1, as an inviter of the meeting, may use his/her first apparatus to perform a method of secure recognition for pervasive face-to-face social communications, as described with respect to FIG. 1. It is noted that in this example the one or more apparatuses as mentioned in block 104 of FIG. 1 comprise multiple apparatuses, which are called as multiple second apparatuses when exemplary operations of the first apparatus of User 1 are described with respect to FIG. 5. Specifically, User 1 may initiate the procedure for generating the recognition protocol at the first apparatus by multicasting a request for a meeting to a group of apparatuses; receiving respective acknowledgments from multiple second apparatuses among the group of apparatuses; and multicasting respective anonymous identifiers of users of the first apparatus and the multiple second apparatuses (such as anonymous IDs of User 1, User 2, . . . , and User n) to the multiple second apparatuses, as illustrated in FIG. 5. Then User 1 may use the first apparatus to perform a process of exchanging the information for the recognition protocol with the multiple second apparatuses (as shown in block 104 of FIG. 1). According to an exemplary embodiment, this exchanging process may comprise: multicasting to the multiple second apparatuses a first pair of parameters which may comprise an identifier of a WD carried by User 1 and an anonymous identifier of User 1; and obtaining respective second pairs of parameters from the multiple second apparatuses through multicast, where the second pair of parameters may comprise an identifier of a WD carried by the user of the second apparatus and an anonymous identifier of the user of the second apparatus. From the perspective of User 1, a negotiation of an argot with the multiple users may be made, for example, by multicasting an argot and its order designed at the first apparatus to the multiple second apparatuses along with a first security parameter (such as a random r1 shown in FIG. 5); receiving respective confirmations of the argot from the multiple second apparatuses along with the first security parameter; multicasting a presentation style of the argot designed at the first apparatus to the multiple second apparatuses along with a second security parameter (such as a random r2 shown in FIG. 5); and receiving respective confirmations of the presentation style along from the multiple second apparatuses with the first security parameter and the second security parameter. Using the first security parameter and the second security parameter can ensure the negotiation security that a user providing an acknowledgement is the user with whom User 1 wants to have the face-to-face meeting and that the confirmed presentation style corresponds to the confirmed argot. In an exemplary embodiment, the first argot may be redesigned if the first apparatus cannot get all confirmations from the multiple second apparatues. Similarly, a second or more argots may be designed by negotiations among multiple users, as shown in FIG. 5.

Correspondingly, User 2, . . . , User n shown in FIG. 5 may respectively initiate the procedure for generating the recognization protocol at their respective apparatuses. Taking User 2 as an example, the procedure for generating the recognization protocol may be initiated at a second apparatus of User 2 by receiving a request for a meeting from a first apparatus of User 1 through multicast. For the sake of clarity, those apparatuses carried by other users (such as User n) except User 1 and User 2 may be called as third apparatuses. In this situation, the one or more apparatuses as mentioned in block 104 of FIG. 1 comprise the first apparatus and at least one third apparatus. In response to the request from the first apparatus, the second apparatus of User 2 may send an acknowledgment to the first apparatus, and then obtain respective anonymous identifiers of users of the first apparatus and the at least one third apparatus through multicast. Then User 2 may use the second apparatus to perform a process of exchanging the information for the recognization protocol with the first apparatus and the at least one third apparatus (as shown in block 104 of FIG. 1). According to an exemplary embodiment, this exchanging process may comprise: obtaining from the first apparatus through multicast a first pair of parameters which may comprise an identifier of a WD carried by User 1 and an anonymous identifier of User 1; providing a second pair of parameters as a response through multicast, which may comprise an identifier of a WD carried by User 2 and an anonymous identifier of User 2; and obtaining a third pair of parameters from a respective of the at least one third apparatus through multicast, wherein the third pair of parameters may comprise an identifier of a WD carried by the user of the third apparatus and an anonymous identifier of the user of the third apparatus. From the perspective of User 2, a negotiation of an argot with the multiple users may be made, for example, by obtaining an argot and its order from the first apparatus along with the first security parameter through multicast; confirming the argot by sending back the first security parameter to the first apparatus; obtaining a presentation style of the argot from the first apparatus along with the second security parameter through multicast; and confirming the presentation style by sending back the first security parameter and the second security parameter to the first apparatus. For example, the presentation style may comprise but not limited to flashing, blinking, color, tone or music attached to an argot, displaying order, or any combination thereof. The identifier of the WD may comprise but not limited to at least one of an identity, a name and a type of the WD. According to exemplary embodiments, the multiple users can enable the recognition protocol generated by respectively demonstrating the recognition protocol designed with the one or more argots and confirming the designed recognition protocol.

Secure recognition for pervasive face-to-face social communications can be realized by executing a recognization protocol. According to exemplary embodiments, when users unknown with each other are in the watching distance, the MWA can warn its users, for example, with a sound and a specific show in the WD. When a user confirms starting recognization, the MWA may start to run the recognization protocol by showing a first argot (or one part of an argot if only one argot is designed) in the WD. Other user(s) can get a notification of the first argot show through MWA communications, and their WDs may respond with a second argot (or other parts of the argot) displaying in the same style or predefined style in order to attract people to see with each other. If the argots match the design, the MWA may control the paired WD to show a next argot (or combined argots) according to a predefined rule (for example, sequentially or concurrently) based at least in part on the recognization protocol design. This coordinated display may continue and repeat until the unknown users can safely recognize with each other. For a simple example, the first argot may be a blinking heart, the second one may be two blinking hearts, and the third one may be two blinking hearts with an arrow passing through them.

The various blocks shown in FIG. 1 and the various message flows illustrated in FIG. 4 and FIG. 5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented method. Other steps and methods may be conceived that are equivalent in function, logic, or effect to one or more steps, or portions thereof, of the illustrated method. Additionally, the order in which a particular method occurs may or may not strictly adhere to the order of the corresponding steps shown.

The described approach in accordance with exemplary embodiments can provide a fashionable and secure solution to help strangers in vicinity to meet with each other after digital communications and based at least in part on initial establish trust. It offers recognization security by enhancing social fascination. This research opens a new horizon of fashionable security study. For example, the security of this approach lies in the fact that argots and their showing style and order may be instantly designed by users through a secure communication way for example via MANET. Other unrelated persons or parties cannot get the details of the recognization protocol, thus they cannot personate the protocol. The correctness of protocol execution may be verified by both users and their MWAs. For example, when user A has found user B whose WD shows the first argot, but user A suddenly does not like to meet with user B before confirming to start the recognization, user A can withdraw the meeting by using his/her MWA to send a cancel signal to user B. In this case user B has no idea who is user A in crowds. On the other hand, the recognization protocol may be generated based at least in part on secure communications for example in MANET. The communication messages may be encrypted and can be only accessed by the authorized users. Since the execution of the recognization protocol may be based at least in part on anonymous IDs used in the protocol design, there is no need for users to disclose their real identities and the secure recognization protocol can ensure that they are the people who would like to meet, which may result in privacy enhancement. Moreover, applying fashionable technology with the coordination of mobile devices and its application, it is easy for users to identify or recognize with each other. The cost of the proposed arrangement may be low. For example, the application of an array of LED lights can further reduce the cost. More importantly, the proposed solution would like to be accepted by users with different occupations and ages, especially for females and young people.

Figure 6:
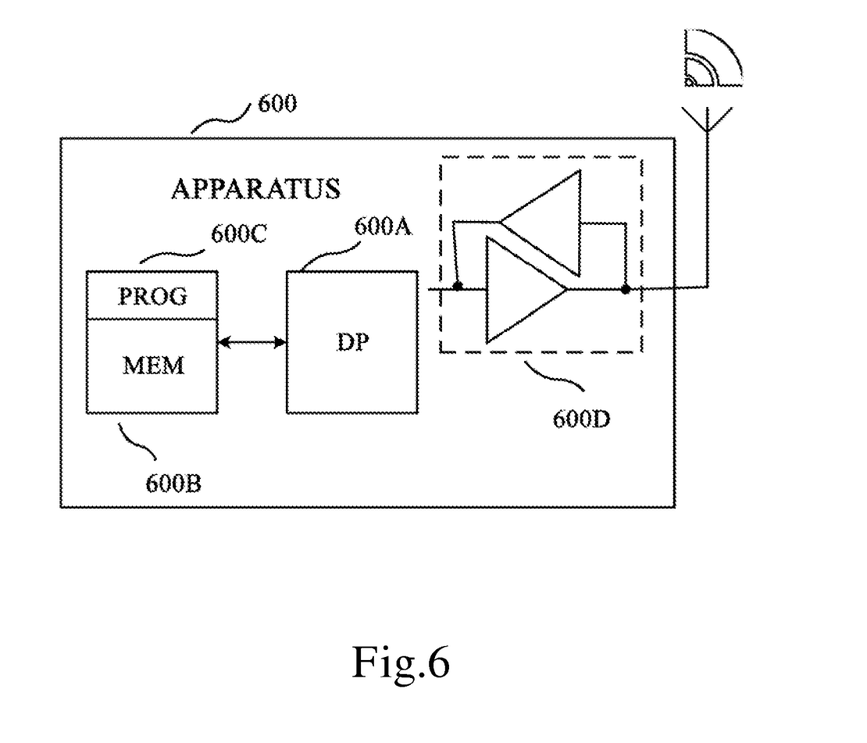
FIG. 6 is a simplified block diagram of an apparatus which is suitable for use in practicing exemplary embodiments of the present invention.

FIG. 6 is a simplified block diagram of an apparatus which is suitable for use in practicing exemplary embodiments of the present invention. In FIG. 6, the apparatus 600 (such as mobile phone, wireless terminal, portable device, user equipment, PDA, multimedia tablet, and etc.) may be adapted for communicating with another apparatus (not shown) directly or through a network node such as base station, Node B, evolved Node B (eNB), control center, access point (AP) and/or the like. In an exemplary embodiment, the apparatus 600 may comprise a data processor (DP) 600A, a memory (MEM) 600B that stores a program (PROG) 600C, and a suitable transceiver 600D for communicating with another apparatus, a network node, a server and so on. For example, the transceiver 600D may be an integrated component for transmitting and/or receiving signals and messages. Alternatively, the transceiver 600D may comprise separate components to support transmitting and receiving signals/messages, respectively. The DP 600A may be used for processing these signals and messages. The PROG 600C is assumed to comprise program instructions that, when executed by the DP 600A, enable the apparatus to operate in accordance with the exemplary embodiments, as discussed above. That is, the exemplary embodiments of the present invention may be implemented at least in part by computer software executable by the DP 600A of the apparatus 600, or by hardware, or by a combination of software and hardware. The MEM 600B may be of any type suitable to the local technical environment and may be implemented using any suitable data storage technology, such as semiconductor based memory devices, flash memory, magnetic memory devices and systems, optical memory devices and systems, fixed memory and removable memory. The DP 600A may be of any type suitable to the local technical environment, and may comprise one or more of general purpose computers, special purpose computers, microprocessors, digital signal processors (DSPs) and processors based on multi-core processor architectures, as non-limiting examples.

Alternatively or additionally, the apparatus 600 may comprise various means and/or components for implementing functions of the foregoing steps and methods in FIG. 1 and FIGS. 4-5. For example, the apparatus 600 may comprise: initiating means for initiating a procedure for generating a recognition protocol; exchanging means for exchanging information for the recognition protocol with one or more other apparatuses, wherein the information indicates wearable devices used in executing the recognition protocol and users carrying the wearable devices; and generating means for generating the recognition protocol by negotiating with the one or more other apparatuses a kind of code word which is presented by the wearable devices during executing the recognition protocol. Alternatively or additionally, the apparatus 600 may comprise one or more integrated and/or separated modules/means/applications (such as MWA) for implementing the specified functions as described with respect to FIGS. 1-5.

Many of the functional units described herein have been labeled as modules or means, in order to more particularly emphasize their implementation independence. For example, a module/means may be implemented as a hardware circuit or in programmable hardware devices. Modules/means may also be implemented in software for execution by various types of processors. Nevertheless, the executables of the modules/means need not be physically located together, but may comprise disparate instructions stored in different locations which, when joined logically together, comprise the modules/means and achieve the stated purpose for the modules/means. Furthermore, modules/means may also be implemented as a combination of software and one or more hardware devices. For instance, a module/means may be embodied in the combination of software executable codes stored on a memory device. In a further example, a module/means may be the combination of a processor that operates on a set of operational data. Still further, a module/means may be implemented in the combination of electronic signals communicated via transmission circuitry.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and so on. As will be realized by one of skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method, comprising:
   initiating a procedure for generating a recognition protocol at a first apparatus by:
      sending a request for a meeting to a second apparatus; and,
      receiving an acknowledgement from the second apparatus;
   exchanging information for the recognition protocol with the second apparatus by:
      providing a first pair of parameters, to the second apparatus, comprising an identifier of a wearable device carried by a user of the first apparatus and an anonymous identifier of the user of the first apparatus; and,
      getting from the second apparatus a response with a second pair of parameters comprising an identifier of a wearable device carried by a user of the second apparatus and an anonymous identifier of the user of the second apparatus; and
   generating the recognition protocol by negotiating with the second apparatus a kind of code word which is presented by the wearable devices during executing the recognition protocol.

2. The method according to claim 1, wherein the kind of code word comprises one or more argots, and said negotiating with the one or more apparatuses comprises:
   sending an original argot and its order designed at the first apparatus to the second apparatus;
   receiving a response with a confirmed argot from the second apparatus, wherein the confirmed argot comprises the original argot, a revised argot or a reply argot;
   sending an original presentation style of the confirmed argot designed at the first apparatus to the second apparatus; and
   receiving a response with a confirmed presentation style from the second apparatus, wherein the confirmed presentation style comprises the original presentation style or a revised presentation style.

3. An apparatus, comprising:
at least one processor; and
at least one memory comprising computer program code,
the at least one memory and the computer program code configured to, with the at least one processor, cause the apparatus to perform at least the following:
  initiate a procedure for generating a recognition protocol by:
    sending a request for a meeting to one or more other apparatuses; and,
    receiving an acknowledgement from the one or more other apparatuses;
  exchange information for the recognition protocol with the one or more other apparatuses by:
    providing a first pair of parameters, to the one or more other apparatuses, comprising an identifier of a wearable device carried by a user of the apparatus and an anonymous identifier of the user of the apparatus; and,
    getting from the one or more other apparatuses a response with a second pair of parameters comprising an identifier of one or more wearable devices carried by users of the one or more other apparatuses and an anonymous identifier of the users of the one or more other apparatuses; and
  generate the recognition protocol by negotiating with the one or more other apparatuses a kind of code word which is presented by the wearable devices during executing the recognition protocol.

4. The apparatus according to claim 3, wherein the apparatus comprises a first apparatus, the one or more other apparatuses comprises a second apparatus, the kind of code word comprises one or more argots, and said negotiating with the one or more other apparatuses comprises:
  sending an original argot and its order designed at the first apparatus to the second apparatus;
  receiving a response with a confirmed argot from the second apparatus, wherein the confirmed argot comprises the original argot, a revised argot or a reply argot;
  sending an original presentation style of the confirmed argot designed at the first apparatus to the second apparatus; and
  receiving a response with a confirmed presentation style from the second apparatus, wherein the confirmed presentation style comprises the original presentation style or a revised presentation style.

5. The apparatus according to claim 3, wherein the apparatus comprises a first apparatus and the one or more other apparatuses comprise multiple second apparatuses, and wherein the procedure for generating the recognition protocol is initiated at the first apparatus by the following:
  multicast a request for a meeting to a group of apparatuses;
  receive respective acknowledgments from the multiple second apparatuses among the group of apparatuses; and
  multicast respective anonymous identifiers of users of the first apparatus and the multiple second apparatuses to the multiple second apparatuses.

6. The apparatus according to claim 5, wherein said exchange the information for the recognition protocol comprises:
  multicast a first pair of parameters to the multiple second apparatuses, wherein the first pair of parameters comprises an identifier of a wearable device carried by the user of the first apparatus and an anonymous identifier of the user of the first apparatus; and
  obtain respective second pairs of parameters from the multiple second apparatuses through multicast, wherein the second pair of parameters comprises an identifier of a wearable device carried by the user of the second apparatus and an anonymous identifier of the user of the second apparatus.

7. The apparatus according to claim 5, wherein the kind of code word comprises one or more argots, and said negotiating with the one or more other apparatuses comprises:
  multicasting an argot and its order designed at the first apparatus to the multiple second apparatuses along with a first security parameter;
  receiving respective confirmations of the argot from the multiple second apparatuses along with the first security parameter;
  multicasting a presentation style of the argot designed at the first apparatus to the multiple second apparatuses along with a second security parameter; and
  receiving respective confirmations of the presentation style from the multiple second apparatuses along with the first security parameter and the second security parameter.

8. The apparatus according to claim 3, wherein the one or more other apparatuses comprise a first apparatus and the apparatus comprises a second apparatus, and wherein the procedure for generate the recognition protocol is initiated at the second apparatus by the following:
  receive a request for a meeting from the first apparatus; and
  send an acknowledgment to the first apparatus.

9. The apparatus according to claim 8, wherein said exchanging the information for the recognition protocol comprises:
  obtaining a first pair of parameters from the first apparatus, wherein the first pair of parameters comprises an identifier of a wearable device carried by a user of the first apparatus and an anonymous identifier of the user of the first apparatus; and
  sending a response with a second pair of parameters to the first apparatus, wherein the second pair of parameters comprises an identifier of a wearable device carried by a user of the second apparatus and an anonymous identifier of the user of the second apparatus.

10. The apparatus according to claim 8, wherein the kind of code word comprises one or more argots, and said negotiate with the one or more other apparatuses comprises:
  receiving an original argot and its order from the first apparatus;
  sending a response with a confirmed argot to the first apparatus, wherein the confirmed argot comprises the original argot, a revised argot or a reply argot;
  receiving an original presentation style of the confirmed argot from the first apparatus; and
  sending a response with a confirmed presentation style to the first apparatus, wherein the confirmed presentation style comprises the original presentation style or a revised presentation style.

11. The apparatus according to claim 3, wherein the one or more other apparatuses comprises a first apparatuses and at least one third apparatus, and the apparatus comprises a second apparatus, and wherein the procedure for generating the recognition protocol is initiated at the second apparatus by the following:
  receiving a request for a meeting from the first apparatus through multicast;
  sending an acknowledgment to the first apparatus; and obtaining respective anonymous identifiers of users of the first apparatus and the at least one third apparatus through multicast.

12. The apparatus according to claim 11, wherein said exchanging the information for the recognition protocol comprises:
   obtaining a first pair of parameters from the first apparatus through multicast, wherein the first pair of parameters comprises an identifier of a wearable device carried by the user of the first apparatus and an anonymous identifier of the user of the first apparatus;
   providing a second pair of parameters as a response through multicast, wherein the second pair of parameters comprises an identifier of a wearable device carried by the user of the second apparatus and an anonymous identifier of the user of the second apparatus; and
   obtaining a third pair of parameters from a respective of the at least one third apparatus through multicast, wherein the third pair of parameters comprises an identifier of a wearable device carried by the user of the third apparatus and an anonymous identifier of the user of the third apparatus.

13. The apparatus according to claim 11, wherein the kind of code word comprises one or more argots, and said negotiating with the one or more other apparatuses comprises:
   obtaining an argot and its order from the first apparatus along with a first security parameter through multicast;
   confirming the argot by sending back the first security parameter to the first apparatus;
   obtaining a presentation style of the argot from the first apparatus along with a second security parameter through multicast; and
   confirming the presentation style by sending back the first security parameter and the second security parameter to the first apparatus.

14. The apparatus according to claim 3, wherein said generating the recognition protocol comprises:
   demonstrating the recognition protocol designed with the kind of code word; and
   confirming the designed recognition protocol.

15. The apparatus according to claim 3 wherein the kind of code word is presented based at least in part on the recognition protocol during the execution of the recognition protocol.

16. A computer program product comprising a non-transitory computer readable medium bearing computer program code embodied therein for use with a computer, the computer program code comprising:
   code for initiating a procedure for generating a recognization protocol by:
      sending a request for a meeting to one or more other apparatuses; and,
      receiving an acknowledgement from the one or more other apparatuses
   code for exchanging information for the recognition protocol with one or more apparatuses by:
      providing a first pair of parameters, to the one or more other apparatuses, comprising an identifier of a wearable device carried by a user of the apparatus and an anonymous identifier of the user of the apparatus; and,
      getting from the one or more other apparatuses a response with a second pair of parameters comprising an identifier of one or more wearable devices carried by users of the one or more other apparatuses and an anonymous identifier of the users of the one or more other apparatuses; and
   code for generating the recognition protocol by negotiating with the one or more apparatuses a kind of code word which is presented by the wearable devices during executing the recognition protocol.

* * * * *